(12) United States Patent
Johansson et al.

(10) Patent No.: US 10,919,357 B2
(45) Date of Patent: Feb. 16, 2021

(54) METHOD AND DEVICE FOR DETERMINING A TRAJECTORY IN OFF-ROAD SCENARIOS

(71) Applicant: VOLKSWAGEN AKTIENGESELLSCHAFT, Wolfsburg (DE)

(72) Inventors: Mikael Johansson, Nykvarn (SE); Volker Patricio Schomerus, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/489,368

(22) PCT Filed: Jan. 29, 2018

(86) PCT No.: PCT/EP2018/052111
§ 371 (c)(1),
(2) Date: Aug. 28, 2019

(87) PCT Pub. No.: WO2018/158020
PCT Pub. Date: Sep. 7, 2018

(65) Prior Publication Data
US 2019/0375261 A1  Dec. 12, 2019

(30) Foreign Application Priority Data

Mar. 1, 2017  (DE) .................. 10 2017 203 276

(51) Int. Cl.
*B60G 17/0165* (2006.01)
*B60W 30/18* (2012.01)
(Continued)

(52) U.S. Cl.
CPC ... *B60G 17/0165* (2013.01); *B60W 30/18009* (2013.01); *B60W 40/06* (2013.01);
(Continued)

(58) Field of Classification Search
CPC ........ B60G 17/0165; B60W 30/18009; B60W 40/06; G06K 9/00791; G06K 9/00798;
(Continued)

(56) References Cited

U.S. PATENT DOCUMENTS 4,952,922 A * 8/1990 Griffin ................... G06T 15/06
345/421
9,062,983 B2 * 6/2015 Zych ...................... G01C 21/32
(Continued)

FOREIGN PATENT DOCUMENTS

DE        10330011 A1    2/2005
DE     102012004198 A1   10/2012
(Continued)

OTHER PUBLICATIONS

Search Report for International Patent Application No. PCT/EP2018/052111; dated Jun. 6, 2018.

*Primary Examiner* — Loi H Tran
(74) *Attorney, Agent, or Firm* — Barnes and Thornburg LLP

(57) ABSTRACT

A method and a device for determining a trajectory in off-road scenarios having a first sensor system for capturing a 2D image of an environment; a first computing unit for classifying 2D image points into at least three classes, wherein a first class is "intended for being driven on", wherein a further class is "can be driven on if necessary" and another class is "cannot be driven on"; a second sensor system for determining a height profile of the environment; a second computing unit for projecting the classified image points into the height profile; and a third computing unit having a trajectory planning algorithm, wherein the third computing unit determines a trajectory using the image points of the first class, wherein the image points of the (Continued)

further class are additionally taken into account in response to an incomplete trajectory in the first class.

11 Claims, 5 Drawing Sheets

(51) Int. Cl.
| | |
|---|---|
| *B60W 40/06* | (2012.01) |
| *G06K 9/00* | (2006.01) |
| *G06N 3/04* | (2006.01) |
| *G06T 7/00* | (2017.01) |
| *G08G 1/16* | (2006.01) |

(52) U.S. Cl.
CPC ....... *G06K 9/00791* (2013.01); *G06N 3/0454* (2013.01); *G06T 7/0002* (2013.01); *G08G 1/163* (2013.01)

(58) Field of Classification Search
CPC ............ G06K 9/00201; G06K 9/4671; G06K 9/6293; G06N 3/0454; G06T 7/0002; G08G 1/163
USPC ........................................................ 348/148
See application file for complete search history.

(56) References Cited

U.S. PATENT DOCUMENTS

| | | | |
|---|---|---|---|
| 9,205,562 B1* | 12/2015 | Konolige | B25J 9/1687 |
| 2005/0015201 A1* | 1/2005 | Fields | G08G 1/163 |
| | | | 701/301 |
| 2010/0299031 A1* | 11/2010 | Zhdanov | E02F 3/845 |
| | | | 701/50 |
| 2017/0210243 A1* | 7/2017 | Olynick | B60L 13/04 |
| 2018/0032801 A1* | 2/2018 | Gur | G06K 9/6256 |
| 2018/0141459 A1* | 5/2018 | Henderson | B60L 13/003 |
| 2019/0011183 A1* | 1/2019 | Baumert | F27D 21/02 |

FOREIGN PATENT DOCUMENTS

| | | |
|---|---|---|
| DE | 102012021420 A1 | 4/2014 |
| DE | 102015007592 A1 | 12/2016 |
| JP | 2016537934 A | 12/2016 |
| WO | 2005008562 A2 | 1/2005 |

\* cited by examiner

METHOD AND DEVICE FOR DETERMINING A TRAJECTORY IN OFF-ROAD SCENARIOS

PRIORITY CLAIM

This patent application is a U.S. National Phase of International Patent Application No. PCT/EP2018/052111, filed 29 Jan. 2018, which claims priority to German Patent Application No. 10 2017 203 276.6, filed 1 Mar. 2017, the disclosures of which are incorporated herein by reference in their entireties.

SUMMARY

Illustrative embodiments relate to a method and an apparatus for ascertaining a trajectory in off-road scenarios.

BRIEF DESCRIPTION OF THE DRAWINGS

The disclosed embodiments are explained more specifically below. In the figures.

DETAILED DESCRIPTION

Figure 1:
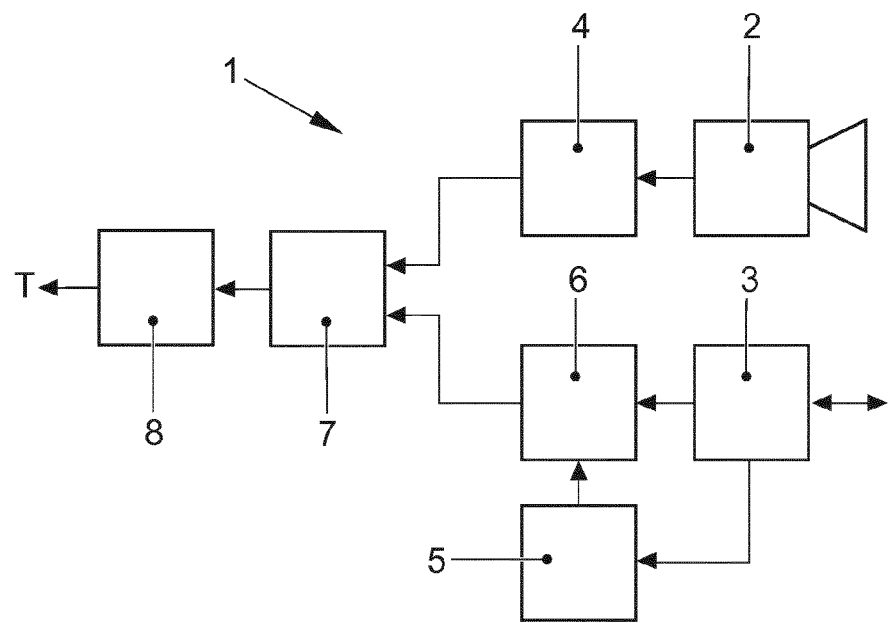
FIG. 1 shows a schematic block diagram of an apparatus for ascertaining a trajectory in an off-road scenario.

Disclosed embodiments relate to a method and an apparatus for ascertaining a trajectory in off-road scenarios.

WO 2005/008562 A2 discloses a method for detecting obstacles in the surroundings of a transportation vehicle for action away from consolidated roads, i.e., for what are known as off-road applications. In this case, a stereo camera arrangement is used to capture surroundings of the transportation vehicle, wherein captured images are evaluated in a stereoscopic image processing section such that a three-dimensional terrain profile is generated. The three-dimensional terrain profile is used to ascertain a terrain usable by the transportation vehicle and ahead of the latter in the surroundings.

DE 10 2012 004 198 A1 discloses a method for assisting a driver in driving a transportation vehicle over terrain, wherein at least one capture unit is used to capture surroundings of the transportation vehicle and data captured by the capture unit are used to ascertain a terrain profile. The captured terrain profile is used to predict critical driving situations for a section of the terrain profile that lies ahead before the section that lies ahead is driven over and graphically output the critical driving situations in the interior of the transportation vehicle by at least one display unit. To this end, the transportation vehicle comprises the capture unit, whose data of the surroundings of the transportation vehicle are used to generate three-dimensional images of the surroundings. The capture unit in this case is a stereo camera, a laser scanner or what is known as a photomixer detector. The three-dimensional images of the surroundings are used to ascertain the terrain profile as a three-dimensional terrain profile, to which end the capture unit has an evaluation unit coupled to it. To ascertain a level of risk, the images of the surroundings captured by the capture unit are evaluated for obstacles that are in a corridor of travel formed by a probable trajectory of the transportation vehicle. Furthermore, the probable trajectory of the transportation vehicle, i.e., the trajectory of the transportation vehicle forecast by the evaluation unit, is taken as a basis for ascertaining a gradient angle, a slope angle, a lateral inclination angle and a ramp angle of the respective section of the terrain profile and for taking these into consideration when ascertaining the level of risk. A trajectory that can be taken in an automated way, for example, is not ascertained, however.

DE 10 2015 007 592 A1 discloses a method for controlling an active chassis of a transportation vehicle on the basis of road height profile data that are in a forecast of a trajectory of the transportation vehicle, wherein the forecast of the trajectory is calculated by a dynamic mathematical model at least on the basis of steering angle data of a steering angle sensor. In this case, the forecast of the trajectory is assigned respective road height profile data captured by at least one ambient sensor, wherein the forecast is used to control at least one actuator of the active chassis. In this case, the forecast of the trajectory is used to control the active chassis only if the trajectory is in an area that has been classified as usable on the basis of surroundings data captured by the at least one ambient sensor.

In recent years, what are known as deep neural networks (DNNs), i.e., networks having many layers and a large number of parameters, have been used to attain impressive results in various areas of image, voice and text processing. In image processing, convolutional neural networks (CNNs) now define the state of the art in many applications. Convolution is a powerful operator in image processing that involves an input image being convoluted with a convolution core, which in turn produces an image in which certain features are highlighted on the basis of the chosen convolution core. As such, an appropriate choice of convolution core allows, e.g., an image to be produced in which only diagonal edges are highlighted in the original image.

In a convolutional neural network, the weights that are optimized are the parameters of such convolution cores. Within a convolutional layer, convolutions are performed with various parameters optimized for the given task, and the result is forwarded to the next layer. As such, in the first layers, low-level features, such as, e.g., edges, are extracted, which are then compounded in the subsequent layers to produce high-level features, such as, e.g., object parts and later to produce whole objects. In many cases, a further layer, e.g., a max-pooling layer, which causes downscaling of the data, i.e., reduction of the output images of the convolution layer, is inserted between two convolution layers. Additionally, max-pooling in which, e.g., four pixels are fused into one carrying the maximum value of the four initial pixels provides for a slight translation invariance in the input data, so that the trained network can also detect objects that occurred in the training data only at other places in the image. For the classification of images, the output of the last convolution or pooling layer can be connected to a multilayer perception, i.e., to completely connected neuron layers, with the number of output neurons of the last layer corresponding to the number of classes. If, instead of a classification, a segmentation of the image is supposed to be performed in which the output of the CNN is in turn an image, the MLP part can be replaced by layers that upscale the downscaled image again, e.g., deconvolutional layer.

Semantic segmentation involves finding a transformation function that maps each image point in the output image onto precisely one class. In transportation vehicle environment perception, for example, pedestrians, automobiles, road boundaries and road markings, are useful classes whose coordinate-accurate detection in the image can help to gain a better understanding of the scene.

To perform this segmentation using a neural network, the input image $E \varepsilon R W \times H \times 3$ (3 channels for color images: RGB) needs to be mapped onto an activation map $A \varepsilon R W \times H \times |C|$, where W and H denote the width and the height of the output image and $|C|$ denotes the number of different classes. For a fixed $c \varepsilon C$, the class-specific measure $A c \varepsilon R W \times H$ contains the unnormalized probability for each image point (w, h) that the point belongs to the class c. The segmentation image $Q \varepsilon C W \times H$ can then be determined as follows:

$$Q_{w,h} = \text{argmax} A_{w,h}^c$$

Each element $Q_{w,h}$ consequently contains precisely one class $c \varepsilon C$ and therefore maps an input image point (w, h) onto this class c.

Continued convolution of the input image with various convolution cores and downscaling in the successive convolutional and pooling layers lead to the original size of the image being greatly reduced. The convolutional part of the neural network (consisting of convolutional, ReLu and pooling layers) can be regarded as a feature extractor in this case, whose application of the learned filters to the input image leads to characteristic features being extracted. To perform a semantic image segmentation, these low-dimensional features need to be upscaled back onto the dimension of the original image to be able to locate the position of the object of the applicable features in the image.

Conventional approaches from image processing use interpolation (for example, bilinear or bicubic interpolation) for this. In this case, the image points of the feature extraction dimension are regarded as discrete points of the interpolation method and the intermediate values of the larger image are estimated by the chosen interpolation method. Fixed bilinear interpolation filters of this kind can be used in a convolutional neural network to produce a semantic segmentation image of the input variable from the feature extraction dimension.

Instead of strictly prescribing the interpolation filter, however, it can also be learned by the network. The benefit in this case is obvious: if multiple successive upsampling layers having nonlinear activation functions are used, then a nonlinear interpolation filter can also be learned that can reconstruct the boundaries of various objects in the image more precisely. Such learning of upsampling filters can be performed, e.g., using a deconvolution layer. In contrast to the convolutional layer, a filter is not convoluted with the input image in this case, but rather a filter to be learned is scaled on an element-by-element basis with the value of each input pixel, and the output matrices thus produced are subsequently displaced relative to one another by stride parameters and summed.

The disclosed embodiments are based on the technical problem of providing a method for ascertaining a trajectory in off-road scenarios and providing a corresponding apparatus.

The solution to the technical problem is obtained by the disclosed method and the disclosed apparatus.

In this regard, the method for ascertaining a trajectory in off-road scenarios comprises the following method operations: A 2D image of the surroundings is recorded by a first sensor system. Subsequently, image points in the 2D image are classified into at least three classes, wherein a first class is "intended for use", a further class is "usable when necessary" and a further class is "unusable".

In addition, a second sensor system is used to ascertain a height profile of the surroundings. The height profile can be ascertained with timing in parallel with recording of the 2D image in this case.

Subsequently, the classified image points are projected into the height profile. Finally, a trajectory is ascertained by a trajectory planning algorithm by using the image points of the first class, wherein in the event of an incomplete trajectory the image points of the further class are additionally taken into consideration. This allows the ascertainment of a trajectory that can be used for automated driving in off-road scenarios. In this case, the classification is effected in the 2D image, this being considerably easier for the classification algorithms than in the 3D height profile. In addition, the quality of the trajectory is considerably improved by the use of two usability classes, since normally only the image points of the first class are used, which are optimum for one trajectory. To now make the ascertainment sufficiently robust however, there is also recourse to the image points of the further class in the event of gaps.

In at least one disclosed embodiment, the image points are classified into at least four classes, wherein a first class is "intended for use", a second class is "usable when necessary", a third class is "usable in an emergency" and a fourth class is "unusable", wherein in the event of an incomplete trajectory the image points of the second class are additionally taken into consideration, wherein in the event of a more incomplete trajectory the image points of the third class are additionally taken into consideration. In this case, the third class covers areas that, although fundamentally usable, should actually only be used in an emergency, for example, to make room for an incoming transportation vehicle or else to be able to continue driving in the first place. In this case, there can alternatively also be provision for the recourse to image points of the third class to be restricted to collision prevention.

In a further disclosed embodiment, the ascertaining of the trajectory is preceded by a reclassification being effected on the basis of transportation vehicle parameters. Therefore, particular performance parameters of the transportation vehicle can be taken into account. By way of example, an initially as "usable in an emergency" image point can prove unusable for the transportation vehicle after projection into the height profile. The benefit of the reclassification is that the fundamental classification can be effected independently of the transportation vehicle.

In a further disclosed embodiment, the ascertaining of the trajectory is preceded by the classified image points being projected from the height profile into a 2D map. Simplistically, the height coordinates are ignored, with the aforementioned reclassification optionally being performed. The benefit of the 2D map is that the established available trajectory planning algorithms are designed for such 2D data.

In a further disclosed embodiment, the recordings of the 2D image are recorded by a mono camera and the height profile is recorded by a laser scanner. The benefit over a stereo camera, which could in principle be used for both, is that the aperture angle of the stereo camera is limited (e.g., 60°). The split over a mono camera and a laser scanner allows, for example, a camera having a fisheye lens to be used, which has an aperture angle of approximately 180°.

A correspondingly large aperture angle can also be realized by a laser scanner, which means that overall a larger portion of the surroundings can be captured in comparison with a stereo camera.

In a further disclosed embodiment, the six degrees of freedom of the laser scanner are ascertained and/or estimated, wherein the height profile is provided from temporally successive measurements of the laser scanner by taking into consideration the respective degrees of freedom. It is therefore also possible for a laser scanner having few scan levels to be used, with further scan levels being added by the inherent motion.

In a further disclosed embodiment, the image points are classified by a convolutional neural network with semantic segmentation. The convolutional neural network permits very good association, which has been confirmed in practical tests.

In regard to the design of the apparatus, reference is made to the full content of the explanations above pertaining to the method.

FIG. 1 depicts a block diagram of an apparatus 1 for ascertaining a trajectory T in an off-road scenario. The apparatus 1 comprises a first sensor system 2 and a second sensor system 3, wherein the first sensor system 2 may be a mono camera and the second sensor system 3 may be a laser scanner. Further, the apparatus 1 comprises a first computing unit 4 for classifying the image points, wherein the computing unit 4 may be a convolutional neural network with semantic segmentation. In this case, the image points are categorized into four classes, wherein a first class is "intended to be used", a second class is "usable when necessary", a third class is "usable in an emergency" and a fourth class is "unusable". If, for example, a large open surface usable without physical limitation is captured, then a particular path within the open surface is ascertained (comparable with lane detection in urban traffic). These areas of the predetermined path would then be first class, and the remaining image points of the open surface would be second class. Further, the apparatus 1 comprises a module 5 for capturing or estimating the six degrees of freedom of the second sensor system 3, which is an inertial measurement unit, for example. In a further module 6, the data of the second sensor system 3 are then used to ascertain a height profile of the surroundings with the aid of the data of the module 5. In this case, it should be noted that the module 6 can also be integrated into the first computing unit 4. Further, the apparatus 1 comprises a second computing unit 7 that projects the classified image points into the height profile. The second computing unit 7 may also be in a form together with the first computing unit 4. The second computing unit 7 then also performs a reclassification of the projected image points on the basis of transportation vehicle parameters and then projects the classified 3D image points of the height profile into a 2D depiction. Finally, the apparatus 1 also has a third computing unit 8, which has a trajectory planning algorithm that uses the classified 2D data to ascertain a trajectory T by using the image points of the first class, wherein in the event of an incomplete trajectory T the image points of the second and, if these are also not sufficient, of the third class are additionally taken into consideration. In this case, the consideration of the image points of the third class can be restricted to emergencies such as collision avoidance.

Figure 2:
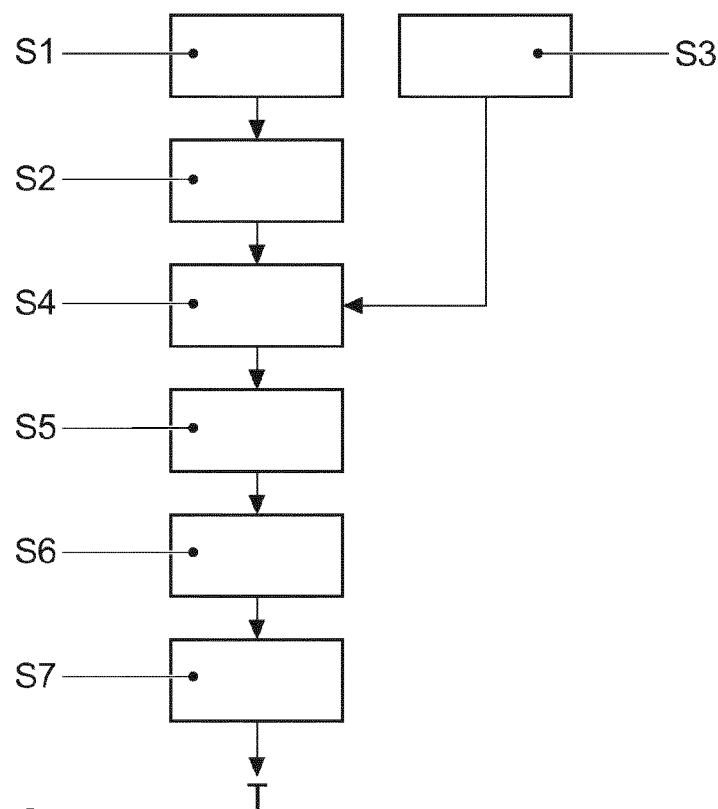
FIG. 2 shows a schematic flowchart for a method for ascertaining a trajectory in an off-road scenario.

FIG. 2 depicts a flowchart for the method. In a first operation at S1, a 2D image of surroundings is recorded and is classified in a second operation at S2, each image point being assigned to one of at least four classes. In an operation at S3, a height profile of the surroundings is ascertained. In an operation at S4, the classified 2D image is then projected into the height profile. In an operation at S5, the classified 3D height profile is then reclassified and is projected into a 2D image in an operation at S6. In an operation at S7, the trajectory T is then ascertained by the 2D image. This trajectory T can then be depicted on a display unit or else taken in an automated or assistive state.

Figure 3A:
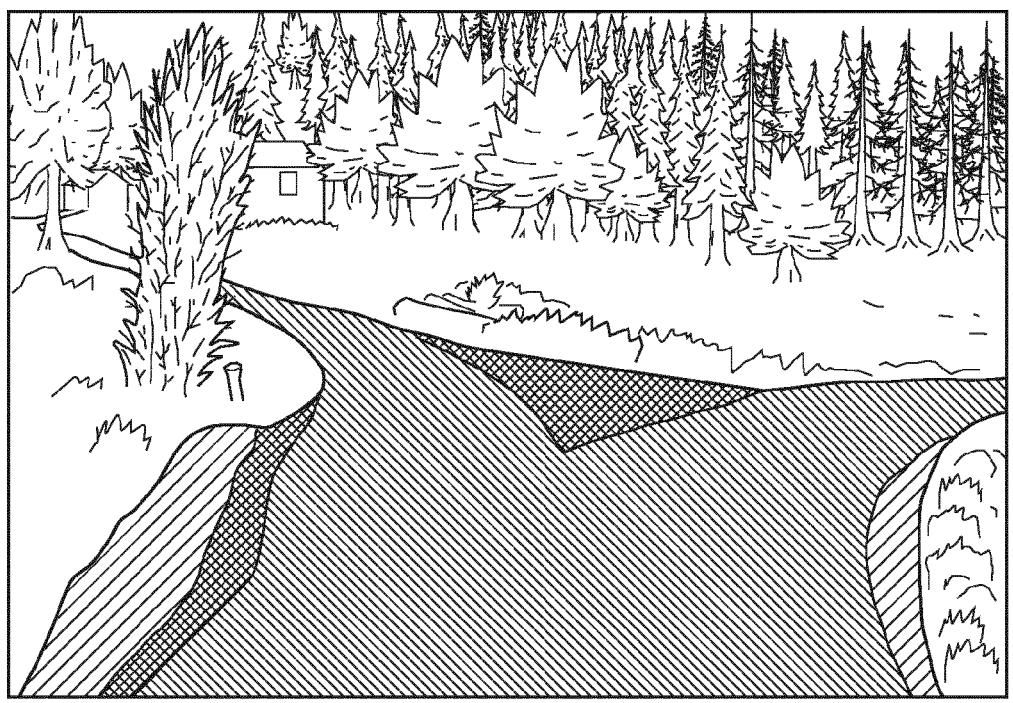
FIG. 3a shows an exemplary classification in a 2D image.

FIG. 3a depicts an exemplary scene in a 2D image, wherein the individual image points have been classified. The narrow-hatched areas are then image points of the first class, the cross-hatched areas are image points of the second class, the wide-hatched areas are image points of the third class and the remaining areas are image points of the fourth class.

Figure 3B:
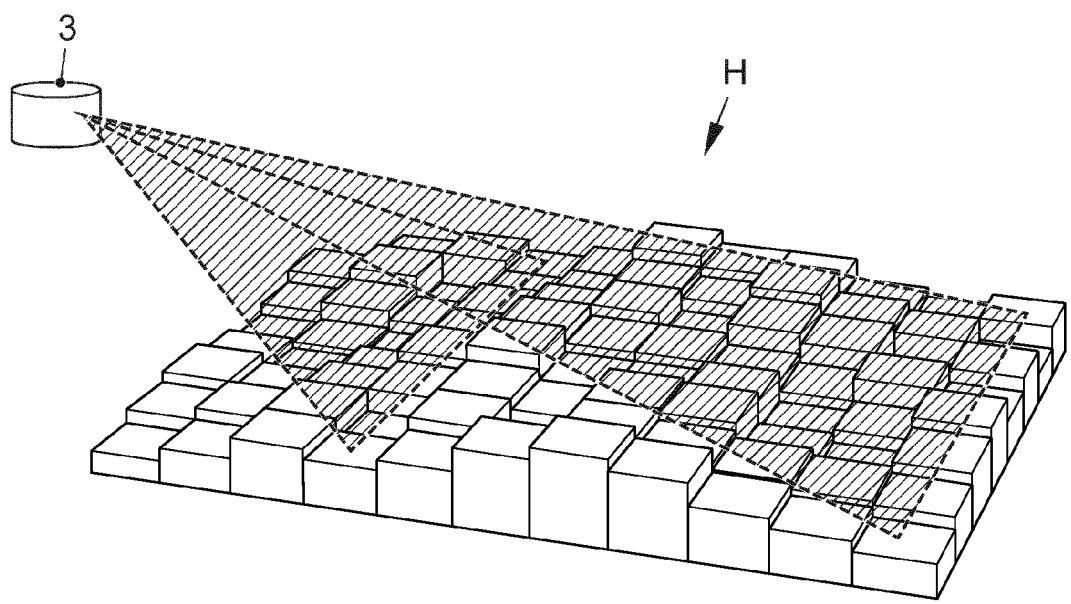
FIG. 3b shows an exemplary depiction for the ascertainment of an associated height profile.

FIG. 3b schematically depicts how the data of the second sensor system 3 are used to ascertain a height profile H of the surroundings.

Figure 3C:
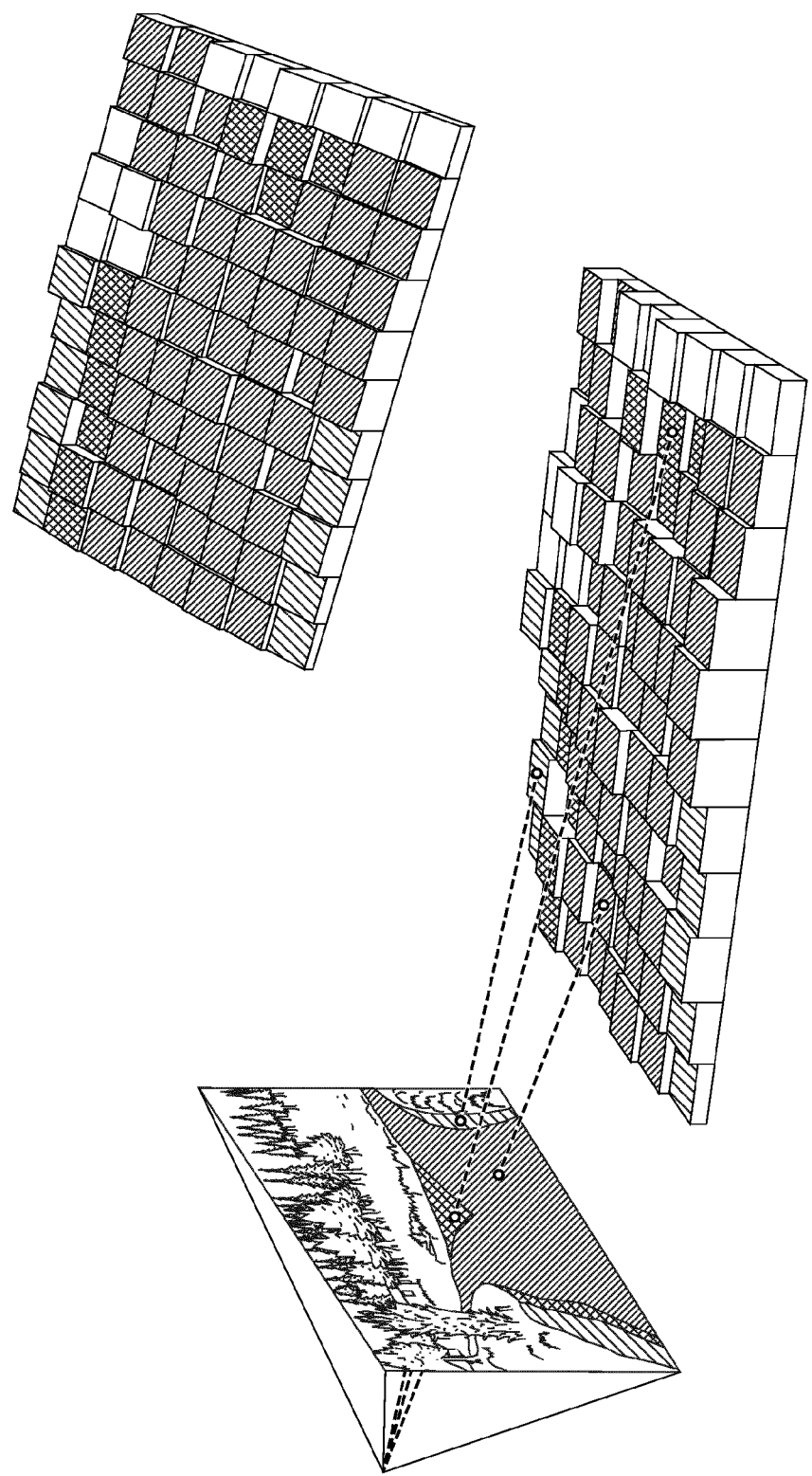
FIG. 3c shows a schematic depiction of the projection of the classified image points shown in FIG. 3a into the height profile shown in FIG. 3b.

FIG. 3c depicts the projection of the classified 2D image points shown in FIG. 3a onto the height profile shown in FIG. 3b, the image points of the fourth class being shown in white (without hatching). The result is also shown in a different perspective in this case in FIG. 3c.

Figure 3D:
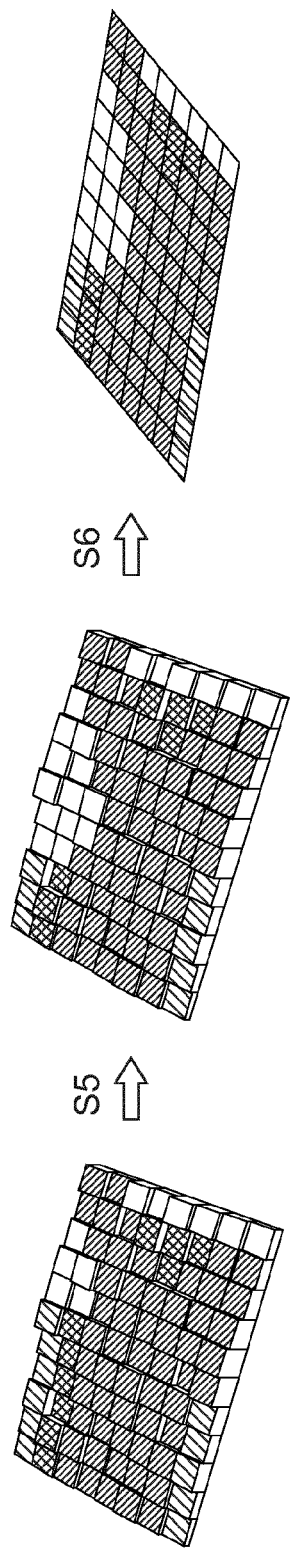
FIG. 3d shows a schematic depiction of a reclassification and 2D projection.

FIG. 3d now depicts operations at 5 and 6 of the method. In this case, a reclassification on the basis of transportation vehicle parameters is first of all effected. The result is that some image points that were previously classified in classes 2 and 3 have been reclassified into class 4 ("unusable"). The reclassified 3D height profile thus ascertained is then projected into a 2D image. As can clearly be seen, the height profile is leveled again (the Z coordinates are set to zero).

Figure 3E:
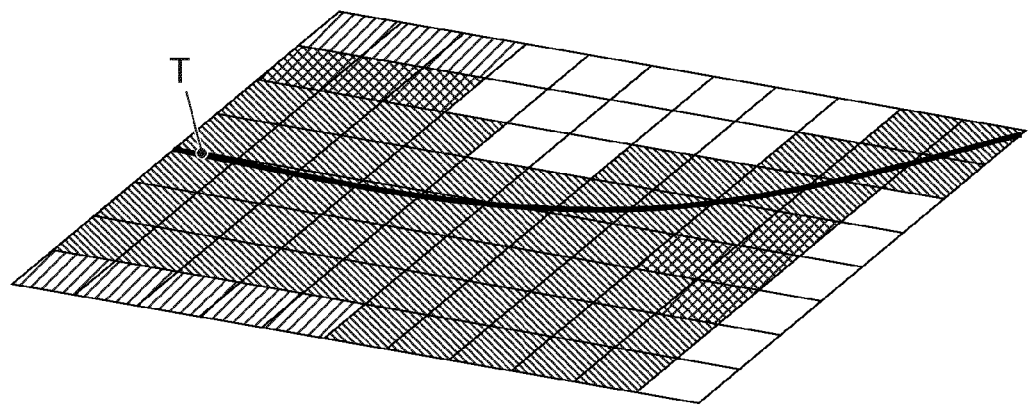
FIG. 3e shows a depiction of a calculated trajectory with data exclusively of the first class.

FIG. 3e now depicts how the trajectory planning algorithm ascertains the trajectory T, with exclusively image points of the first class being used.

Figure 3F:
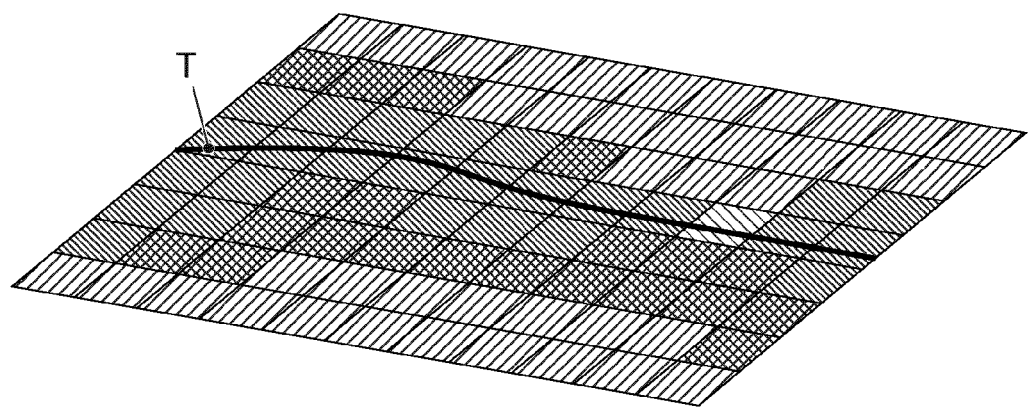
FIG. 3f shows a depiction of a calculated trajectory with data of the first and second classes.

FIG. 3f now depicts how the trajectory T is ascertained when a continuous trajectory T cannot be placed over image points of the first class. In this case, the trajectory planning algorithm additionally uses the image points of the second class.

The invention claimed is:

1. A method for ascertaining a trajectory in off-road scenarios, the method comprising:
   recording a 2D image of the surroundings by a first sensor system;
   classifying image points in the 2D image into at least four classes, wherein a first class is "intended for use", a second class is "usable when necessary", a third class is "usable in an emergency" and a fourth class is "unusable";
   ascertaining a 3D height profile by a second sensor system;
   projecting the classified image points into the 3D height profile; and
   ascertaining a trajectory by a trajectory planning algorithm by using the image points of the first class, wherein the image points of the second class are additionally taken into consideration in response to an incomplete trajectory in the first class, wherein the image points of the third class are additionally taken into consideration in response to an incomplete trajectory in the second class, wherein the image points of the fourth class are additionally taken into consideration in response to an incomplete trajectory in the third class, wherein the ascertaining of the trajectory is preceded by a reclassification based on transportation vehicle parameters.

2. The method of claim 1, wherein the ascertaining of the trajectory is preceded by the classified image points being projected from the 3D height profile into a 2D map.

3. The method of claim 1, wherein the 2D image is recorded by a mono camera and the 3D height profile is recorded by a laser scanner.

4. The method of claim 3, wherein the six degrees of freedom of the laser scanner are ascertained and/or estimated, wherein the 3D height profile is provided from temporally successive measurements of the laser scanner by taking into consideration the respective degrees of freedom.

5. The method of claim 1, wherein the image points are classified by a convolutional neural network with semantic segmentation.

6. An apparatus for ascertaining a trajectory in off-road scenarios, the apparatus comprising:
 a first sensor system for recording a 2D image of surroundings;
 a first computing unit for classifying 2D image points into at least four classes, wherein a first class is "intended for use", a second class is "usable when necessary", a third class is "usable in an emergency" and a fourth class is "unusable";
 a second sensor system for ascertaining a 3D height profile of the surroundings;
 a second computing unit for projecting the classified image points into the 3D height profile; and
 a third computing unit having a trajectory planning algorithm, wherein the third computing unit ascertains a trajectory by using the image points of the first class, wherein the image points of the second class are additionally taken into consideration in response to an incomplete trajectory in the first class, wherein the image points of the third class are additionally taken into consideration in response to an incomplete trajectory in the second class, wherein the image points of the fourth class are additionally taken into consideration in response to an incomplete trajectory in the third class, wherein the ascertaining of the trajectory is preceded by a reclassification based on transportation vehicle parameters.

7. The apparatus of claim 6, wherein the first sensor system is a mono camera and the second sensor system is a laser scanner.

8. The apparatus of claim 6, wherein the first computing unit is a convolutional neural network with semantic segmentation.

9. The apparatus of claim 6, wherein the ascertaining of the trajectory is preceded by the classified image points being projected from the 3D height profile into a 2D map.

10. The apparatus of claim 7, wherein the six degrees of freedom of the laser scanner are ascertained and/or estimated, wherein the 3D height profile is provided from temporally successive measurements of the laser scanner by taking into consideration the respective degrees of freedom.

11. The apparatus of claim 6, wherein the image points are classified by a convolutional neural network with semantic segmentation.

\* \* \* \* \*